(12) United States Patent
Kuno

(10) Patent No.: US 9,752,526 B2
(45) Date of Patent: Sep. 5, 2017

(54) LOAD DRIVING DEVICE

(71) Applicant: DENSO CORPORATION, Kariya, Aichi-pref. (JP)

(72) Inventor: Ryotaro Kuno, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 14/306,550

(22) Filed: Jun. 17, 2014

(65) Prior Publication Data

US 2014/0380086 A1    Dec. 25, 2014

(30) Foreign Application Priority Data

Jun. 20, 2013  (JP) ................................ 2013-129684

(51) Int. Cl.
| | | |
|---|---|---|
| *G11C 11/4097* | (2006.01) | |
| *F02D 41/28* | (2006.01) | |
| *F02D 41/20* | (2006.01) | |
| *F02D 41/22* | (2006.01) | |

(52) U.S. Cl.
CPC ............ *F02D 41/28* (2013.01); *F02D 41/20* (2013.01); *F02D 41/221* (2013.01); *F02D 2041/2086* (2013.01); *F02D 2041/286* (2013.01); *Y02T 10/40* (2013.01)

(58) Field of Classification Search
CPC ... G11C 11/4097; G11C 7/1051; G11C 7/106; G11C 2207/107
See application file for complete search history.

(56) References Cited

U.S. PATENT DOCUMENTS

| | | | | |
|---|---|---|---|---|
| 5,771,161 A | * | 6/1998 | Jackson | ..................... H02J 3/01 307/64 |
| 6,198,720 B1 | * | 3/2001 | Deschaine | .......... H04L 49/1523 370/220 |
| 2003/0094858 A1 | * | 5/2003 | Shiue | ..................... H01H 47/18 307/141 |

(Continued)

FOREIGN PATENT DOCUMENTS

| | | |
|---|---|---|
| JP | 2002-123301 | 4/2002 |
| JP | 2011-174397 | 9/2011 |

OTHER PUBLICATIONS

Office Action (2 pages) dated Apr. 14, 2015, issued in corresponding Japanese Application No. 2013-129684 and English translation (3 pages).

*Primary Examiner* — Jigar Patel
(74) *Attorney, Agent, or Firm* — Nixon & Vanderhye P.C.

(57) ABSTRACT

A load driving device including a converter, an output circuit and a timer circuit is provided. The converter receives a communication frame including a data signal through a serial communication and performs parallel conversion on the data signal to output an instruction signal instructing the output circuit to transition to a first state when the data signal includes first serial data and output an instruction signal instructing the output circuit to transition to a second state when the data signal includes second serial data. A timer circuit measures a duration time during which the converter receives the first serial data. When the measuring duration time arrives at an abnormality determination time, the timer circuit forces the output circuit to transition to the second state when the measuring duration time arrives at an abnormality determination time.

13 Claims, 6 Drawing Sheets

(56) References Cited

U.S. PATENT DOCUMENTS

| | | | |
|---|---|---|---|
| 2003/0105891 A1* | 6/2003 | Moriyama | G05B 19/0423 710/2 |
| 2003/0112906 A1* | 6/2003 | Pigott | G04R 40/04 375/354 |
| 2004/0117570 A1* | 6/2004 | Samuel | G05B 19/056 711/156 |
| 2005/0015160 A1 | 1/2005 | Hashimoto et al. | |
| 2006/0018636 A1 | 1/2006 | Watanabe et al. | |
| 2010/0005215 A1 | 1/2010 | Kneer et al. | |
| 2010/0296355 A1* | 11/2010 | Mochida | G11C 7/1039 365/205 |
| 2012/0140924 A1* | 6/2012 | Murakami | H04N 21/43635 380/200 |

* cited by examiner

LOAD DRIVING DEVICE

CROSS REFERENCE TO RELATED APPLICATION

The present application is based on Japanese Patent Application No. 2013-129684 filed on Jun. 20, 2013, disclosure of which is incorporated herein by reference.

TECHNICAL FIELD

The present disclosure relates to a load driving device that receives control data through a serial communication, and drives a load on the basis of the control data.

BACKGROUND

JP-2009-507305A discloses a peripheral component as an example of load driving device. This load driving device is connected to a computing device (hereinafter called "microcomputer") through a serial multiline bus. Additionally, the load driving device includes an output stage for transmitting serial data to an external device.

Explanation is given on studies of the inventor of the present application, which are not the prior art. It is conceivable to determine whether abnormality is present in the received control data. An example of a method of determining whether the abnormality is present or not may include a parity check and a sum check.

However, the load driving device can conduct the above-mentioned determination when a communication cycle with the microcomputer is relatively long, but the determination is difficult when the communication cycle with the microcomputer is short. For example, the load driving device in JP-T-2009-507305 is connected to the microcomputer by a microsecond channel. The microsecond channel is characterized by a high-speed communication, and the communication cycle of a downstream is several µs. During this communication cycle, it is difficult that the microcomputer continuously implements calculation such as the parity check or the sum check by software. Additionally, during this communication cycle, it is difficult to add an error check bit to a data frame of the control data. Hereinafter, the microsecond channel is called "MSC" for simplicity.

As described above, there is a possibility that the load driving device could not determine whether abnormality is present in the received control data or not. Therefore, the load driving device may suffer from such a difficulty that when the abnormality is present in the received control data, the abnormality is generated in an output based on the control data, and the abnormality of the output is continued.

SUMMARY

The present disclosure has been made in view of the above foregoing. It is an object of the present disclosure is to provide a load driving device that can prevent an output abnormality from being continued even when the abnormality is generated in control data.

According to an example of the present disclosure, a load driving device receives a communication frame including a data signal through a serial communication and sets an output state of a load driving output, which is for driving at least one load, to a first state and a second state different from the first state based on a control data when the control data is included in the received communication frame as the data signal. The load driving device includes a converter, at least one output circuit and a timer circuit. The converter receives the communication frame and performs parallel conversion on the data signal included in the communication frame to output a converted signal. When a first serial data indicating a transition instruction to transition to the first state is included as the control data in the communication frame, the converter performs the parallel conversion to output a first instruction signal indicating the transition instruction to transition to the first state. When a second serial data indicating a transition instruction to transition to the second state is included as the control data in the communication frame, the converter performs the parallel conversion to output a second instruction signal indicating the transition instruction to the second state. The output circuit has the first state when the first instruction signal is outputted from the converter, and has the second state when the second instruction signal is output from the converter. The timer circuit measures a duration time during which the converter receives the first serial data. The timer circuit instructs the output state of the output circuit, in such a manner that the timer circuit forces the output circuit to transition to the second state when the measuring duration time arrives at an abnormality determination time.

In the above load driving device, the converter performs the parallel conversion on the first serial data being the received control data and outputs the first instruction signal indicating the transition instruction to transition to the first state. Additionally, the converter performs the parallel conversion on the second serial data being the received control data and outputs the second instruction signal indicating the transition instruction to transition to the second state. The output circuit has the first state as the output state when the first instruction signal is outputted from the converter, and has the second state as the output state when the second instruction signal is outputted from the converter. In this way, the load driving device can drive the load on the basis of the control data.

Further, in the above load driving device, the timer circuit measures the duration time in which the first serial data is received and the first instruction signal is outputted. When the duration time reaches the abnormality determination time, the output state of the output circuit is forced to transition to the second state. With the above operation, even when the output state of the output circuit becomes abnormal due to generation of abnormality in the control data, the abnormality of the output state can be prevented from being continued. That is, the above load driving device can prevent the abnormality of the output state from being continued for a longer time than the abnormality determination time.

DETAILED DESCRIPTION

Hereinafter, a load driving device according an embodiment of the present disclosure will be described with reference to the accompanying drawings. In this embodiment, the load driving device is applied to an electronic control unit (ECU) 100.

Figure 1:
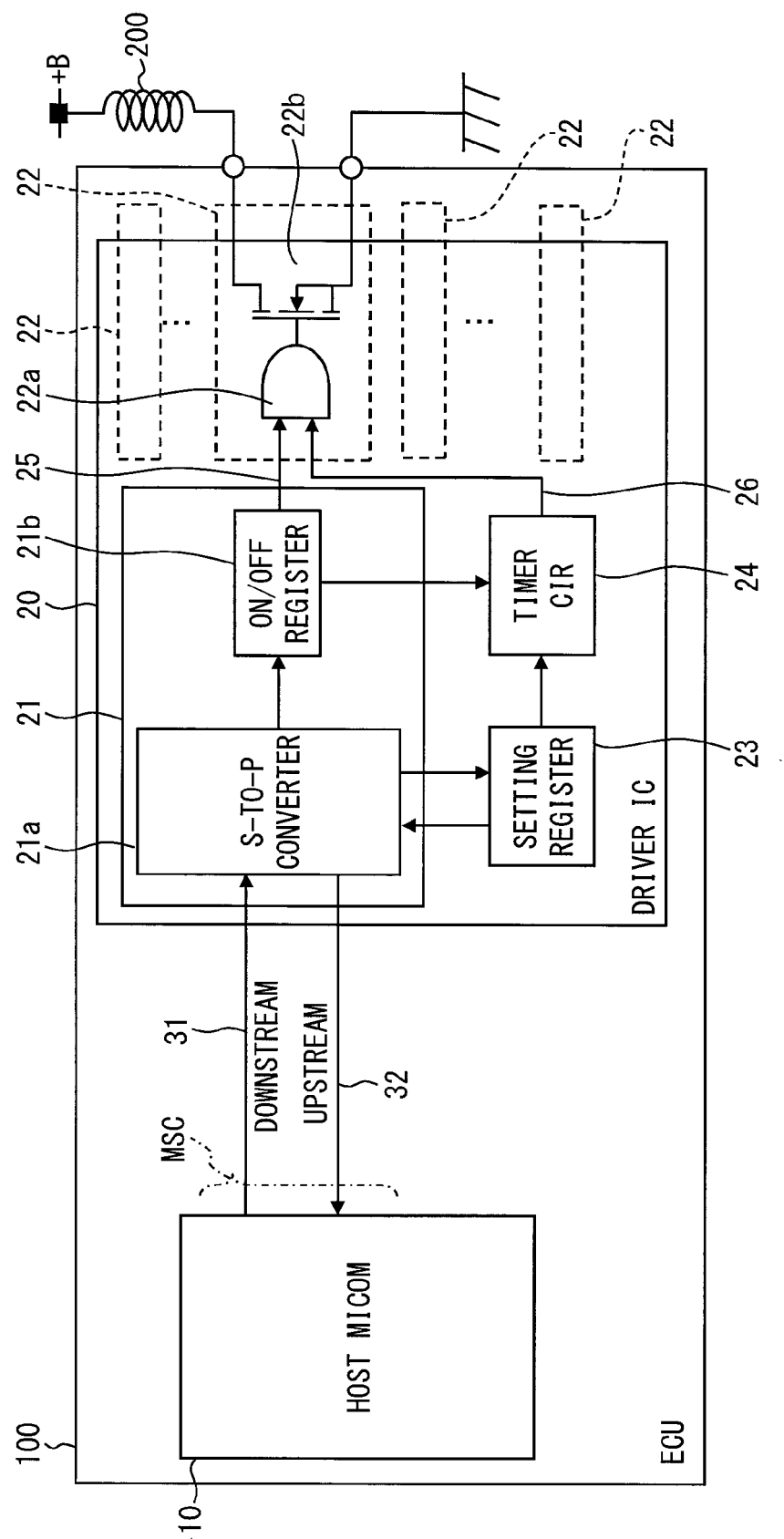
FIG. 1 is a block diagram illustrating a configuration of an electronic control unit according to an embodiment.

As illustrated in FIG. 1, the electronic control unit 100 drives at least one load 200, and includes a host microcomputer 10, and a driver IC 20. The driver IC 20 corresponds to the load driving device. The electronic control unit 100 can be applied to, for example, an engine control unit that control an operation state of an engine (not shown) of a vehicle. In this case, the electronic control unit 100 controls the drive of an electric load such as an ignition coil, a fuel injection valve, a throttle valve motor, or a fuel pump motor as the load 200. However, the present disclosure is not limited to the above configuration. That is, the driver IC 20 may be mounted on a control unit which controls an instrument or a device other than the engine. Hereinafter, the host microcomputer is merely called "microcomputer". The IC is an abbreviation of "integrated circuit".

The microcomputer 10 and the driver IC 20 are connected to each other through microsecond channel (MSC) communication lines 31 and 32, and transmit and receive a communication frame including a data signal through a serial communication using the MSC. Hence, the microcomputer 10 and the driver IC 20 each have an MSC interface (not shown), and are configured to be communicatable with each other through those MSC interfaces and the MSC communication lines 31, 32. The MSC communication line 31 is a transmission line for downstream from the microcomputer 10 to the driver IC 20. The MSC communication line 32 is a transmission line for upstream from the driver IC 20 to the microcomputer 10. Although described later, the data signal includes control data and command data.

The MSC interface is a communication interface for conducting a serial communication at high speed, and the MSC communication lines 31 and 32 are communication lines for conducting the serial communication at high speed. Hence, the MSC interface, and the MSC communication lines 31, 32 enable, for example, the communication frame to be transmitted within a time of 1 to several μs. In this way, the microcomputer 10 and the driver IC 20 can transmit and receive the communication frame in a communication cycle of a microsecond level. The MSC is a high-speed serial communication method that is suitable for the driving of the load 200 desired to turn on/off without any delay. The load 200 desired to turn on/off without any delay may be the above-mentioned ignition coil or fuel injection valve.

The microcomputer 10 includes a CPU, a ROM, a RAM, and an I/O not shown, in addition to the MSC interface. The CPU is an abbreviation of the central processing unit, the ROM is an abbreviation of the read only memory, the RAM is an abbreviation of the random access memory, and the I/O is an abbreviation of the input/output.

The microcomputer 10 receives detection signals of various sensors through the I/O in order to detect the operation state of the engine. For example, the microcomputer 10 receives the detection signals from a throttle position sensor that detects a position of a throttle valve disposed in an intake pipe, a crank angle sensor that outputs a crank angle signal for each given crank angle of the engine, an air flow sensor that detects the amount of intake air of the engine, a cooling water temperature sensor that detects a temperature of the engine cooling water, or an oxygen concentration sensor that detects an oxygen concentration in an exhaust gas.

The microcomputer 10 executes various arithmetic programs stored in the ROM to calculate the control data for controlling the operating state of the engine in a desired state on the basis of the present operating state of the engine. The microcomputer 10 transmits the control data including a calculation result to the driver IC 20.

In this embodiment, first serial data indicative of a transition instruction, which instructs the driver IC 20 to transition to a first state, and second serial data indicative of the transition instruction, which instructs the driver IC 20 to transition to a second state, are transmitted as the control data. The first state and the second state each indicate a state of a load driving output of the driver IC 20. That is, the driver IC 20 can employ the first state and the second state different from the first state, as states of the load driving output for driving the load 200. In this embodiment, an on-state is set as the first state, and an off-state is set as the second state. Hence, the first serial data is the control data indicative of an on-instruction, and the second serial data is the control data indicative of an off-instruction. However, the present disclosure is not limited to this configuration. The present disclosure applies the off-state as the first state, and the on-state as the second state. In the following description, the control data indicative of the on-instruction is merely called "on-instruction", and the control data indicative of the off-instruction is merely called "off-instruction".

Further, to the driver IC 20, the microcomputer 10 transmits command data for instructing the driver IC 20 to notify an error flag or for instructing the driver IC 20 to change setting data. The command data will be described in detail later.

Figure 2:
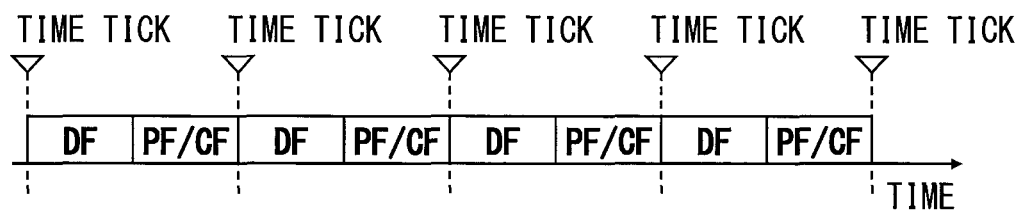
FIG. 2 is a diagram illustrating a communication frame of a downstream in the electronic control unit in FIG. 1.

When the microcomputer 10 transmits the control data and the command data to the driver IC 20, the MSC interface provided in the microcomputer 10 generates a data frame (DF) including the control data and a command frame (CF) including the command data. The MSC interface provided in the microcomputer 10 transmits the generated data frame and command frame to the driver IC 20 through the MSC communication line 31. In this way, the above-mentioned communication frame includes the data frame and the command frame. Although a detailed description thereof will be omitted, the MSC interface provided in the microcomputer 10 may generate a passive frame (PF) instead of the command frame, and transmit the generated passive frame to the driver IC 20 through the MSC communication line 31. For example, as illustrated in FIG. 2, the microcomputer 10 successively and repetitively transmits the data frame and the command frame.

As illustrated in FIG. 1, the driver IC 20 mainly includes a serial-to-parallel converter 21, output circuits 22, and a timer circuit 24. The driver IC 20 is equipped with a signal line 25 that connects the serial-to-parallel converter 21 and the output circuits 22, and a signal line 26 that connects the timer circuit 24 and the output circuits 22. Further, the driver IC 20 may include a setting register 23.

The driver IC 20 receives the data frame and the command frame transmitted from the microcomputer 10, through the MSC communication line 31. When the driver IC 20 receives, for example, the data frame, the driver IC 20 is put into the first state or the second state depending on the control data included in the data frame. In other words, the driver IC 20 outputs the on-signal and the off-signal as a load driving output for driving the load 200 on the basis of the control data. Additionally, since the driver IC 20 receives the data frame at high speed by the MSC, the driver IC 20 can suppress a delay time since the data frame is transmitted from the host microcomputer 10 until the state transitions from the first state to the second state, and from the second state to the first state.

The serial-to-parallel converter 21 corresponds to a converter. The converter 21 includes, for example, a serial-to-parallel converter circuit 21a, and an on/off register 21b. Hereinafter, the serial-to-parallel converter is merely called "converter". The serial/parallel conversion circuit is merely called "converter circuit".

The converter 21 receives the communication frame transmitted from the microcomputer 10. In more detail, the converter circuit 21a receives the communication frame. The serial-to-parallel converter circuit 21a performs parallel conversion on the data signal included in the received communication frame, and outputs the converted signal. When the converter circuit 21a receives the data frame and the on-instruction is included in the data frame as the control data, the converter circuit 21a performs parallel conversion on the on-instruction to output a first instruction signal (high-level) indicative of the transition instruction to the first state. When the converter circuit 21a receives the data frame and an off-instruction is included in the data frame as the control data, the converter circuit 21a performs parallel conversion on the off-instruction to output a second instruction signal (low-level) indicative of the transition instruction to the second state. The first instruction signal and the second instruction signal are collectively called "output instruction signal" r when the first instruction signal and the second instruction signal do not need to distinguish from each other.

The on/off register 21b stores the output instruction signal outputted from the converter circuit 21a therein. The output instruction signal stored in the on/off register 21b is outputted to the output circuits 22 and the timer circuit 24. For that reason, in other words, the converter 21 outputs the output instruction signal to the output circuits 22 and the timer circuit 24 through the on/off register 21b.

Each of the output circuits 22 includes, for example, an AND circuit 22a and a MOSFET 22b. One input terminal of the AND circuit 22a is connected with the signal line 25, and the other input terminal of the AND circuit 22a is connected with the signal line 26. An output terminal of the AND circuit 22a is connected to a gate terminal of the MOSFET 22b. One input terminal of the AND circuit 22a receives the output instruction signal from the converter 21 through the signal line 25, and the other input terminal of the AND circuit 22a receives an output enable signal from the timer circuit 24 through the signal line 26. The output circuit 22 puts the output state into the first state or the second state by allowing the AND circuit 22a to turn on and off the MOSFET 22b on the basis of the output instruction signal and the output enable signal. The output circuit 22 puts the output state into the first state or the second state on the basis of the output instruction signal when the output circuit 22 receives the output enable signal. The output circuit 22 puts the output state into the second state regardless of the output instruction signal when the output circuit 22 does not receive the output enable signal.

The total number of output circuits 22 may correspond to the total number of loads 200 driven by the electronic control unit 100. Hence, the driver IC 20 may be equipped with one output circuit 22, or a plurality of output circuits 22.

Various setting values in the driver IC 20 are stored in the setting register 23. For example, a setting value such as an error determination threshold value for determining abnormality is stored in the setting register 23. The abnormality may be that the first state is continued. The error determination threshold value corresponds to an abnormality determination time.

The timer circuit 24 measures a duration time in which the converter 21 outputs the first instruction signal, and indicates the output state of the output circuit 22. In more detail, with reference to a value of the on/off register 21b, the timer circuit 24 can measure the duration time of the outputting of the first instruction signal from the converter 21. In other words, the timer circuit 24 measures the duration time in which the converter circuit 21a outputs the first instruction signal. In this way, the timer circuit 24 measures the duration time of the first instruction signal to measure the duration time of the first state (on-state in this situation). That is, the timer circuit 24 measures the duration time of the first instruction signal to measure the duration time in which the converter 21 receives the on-instruction.

The timer circuit 24 outputs the output enable signal, or stops the output of the output enable signal. In this way, the timer circuit 24 indicates the output state of the output circuit 22. When the duration time of the first state arrives at the error determination threshold value, the timer circuit 24 determines that there is the duration abnormality, and stops the output of the output enable signal. Hence, the timer circuit 24 can be called "abnormality duration determination timer". As described above, in this embodiment, the on-state is applied as the first state. For that reason, the abnormality in which the first state is continued can be called "on-duration abnormality".

Now, the operation of the driver IC 20 will be described with reference to FIGS. 3 to 6. The operation of the driver IC 20 will be described together with the operation of the microcomputer 10. When the driver IC 20 is put into an operable state, e.g., when the driver IC 20 is supplied with electric power, the timer circuit 24 outputs the output enable signal.

First, the operation when the microcomputer 10 and the driver IC 20 are normal will be described with reference to FIG. 3. The normal time is a time period from when an enable-command is transmitted from the microcomputer 10 to when a disable-command is transmitted from the microcomputer 10. The enable-command and the disable-command will be described later.

Figure 3:
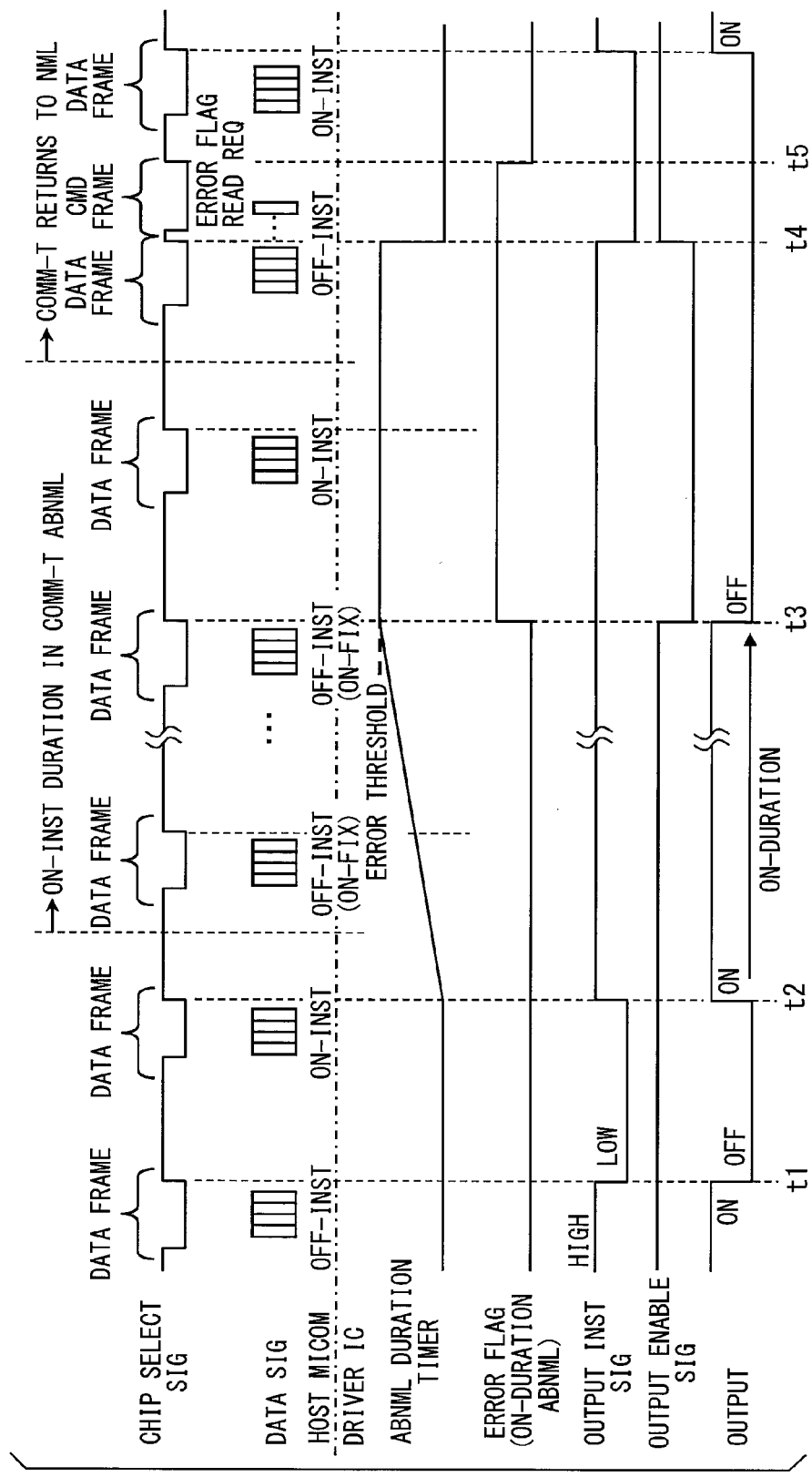
FIG. 3 is a timing chart illustrating processing operation in the electronic control unit of FIG. 1.

As illustrated in FIG. 3, the microcomputer 10 transmits the data frame and the command frame to the driver IC 20 in a given communication cycle (chip select signal). That is, the microcomputer 10 transmits the data frame or the command frame to the load 200 to be driven.

When the driver IC 20 receives the data frame including the off-instruction transmitted from the microcomputer 10, the driver IC 20 operates as indicated at a timing t1. The converter 21 performs parallel conversion on he received data signal, and outputs the second instruction signal as the output instruction signal. Since the timer circuit 24 receives the second instruction signal, the timer circuit 24 does not start the measurement of a time while maintaining the output of the output enable signal. Then, since the output circuit 22 receives the second instruction signal, and receives the output enable signal, the output circuit 22 transitions from an on-state to an off-state on the basis of the second instruction signal.

Subsequently, when the driver IC 20 receives the data frame including the on-instruction transmitted from the microcomputer 10, the driver IC 20 operates as indicated at a timing t2. The converter 21 performs parallel conversion on the received data signal, and outputs the first instruction signal as the output instruction signal. Since the timer circuit 24 receives the first instruction signal, the timer circuit 24 starts the measurement of the time while maintaining the output of the output enable signal. That is, the timer circuit 24 starts the measurement of the time when the input switches from the second instruction signal to the first instruction signal. Then, since the output circuit 22 receives the first instruction signal, and receives the output enable signal, the output circuit 22 transitions from the off-state to the on-state on the basis of the first instruction signal. When the input switches from the first instruction signal to the second instruction signal, the timer circuit 24 clears the measuring duration time.

In this way, the driver IC 20 performs parallel conversion on the off-instruction received by the converter 21 to output the second instruction signal, or performs parallel conversion on the on-instruction to output the first instruction signal. Then, the driver IC 20 puts the output circuit 22 into the second state when the second instruction signal is outputted from the converter 21, and puts the output circuit 22 into the first state when the first instruction signal is outputted from the converter 21, so that the driver IC 20 can drive the load on the basis of the control data.

Subsequently, explanation will be given on cases in which the microcomputer 10 successively transmits the data frame including the on-instruction without transmitting the data frame including the off-instruction. This situation can be caused by some communication abnormality. For example, abnormality of on-fixation is generated in a communication terminal connected with, for example, the MSC communication line 31.

In this case, the converter 21 continues the output of the first instruction signal. Since the timer circuit 24 successively receives the first instruction signal, the timer circuit 24 continues the measurement of the time while maintaining the output of the output enable signal. Since the output circuit 22 successively receives the first instruction signal and the output enable signal, the output circuit 22 continues the on-state on the basis of the first instruction signal. In the example of FIG. 3, the output circuit 22 continues the on-state between the timings t2 and t3.

Then, when the measured time arrives at the error determination threshold value as indicated at the timing t3, the timer circuit 24 stops the output of the output enable signal by regarding this situation as on-duration abnormality. However, the converter 21 continues the output of the first instruction signal. Then, since the input of the output enable signal stops, even when the output circuit 22 receives the first instruction signal, the output circuit 22 transitions from the on-state to the off-state. In other words, when the time measured by the timer circuit 24 arrives at the error determination threshold value, the driver IC 20 executes fail-safe.

In this way, when the timer circuit 24 measures the duration time in which the first instruction signal is outputted, and when the duration time arrives at the error determination threshold value, the driver IC 20 forces the output state of the output circuit 22 to transition to the second state. As a result, because the abnormality is generated in the on-instruction of the control data, even when the output state of the output circuit 22 becomes abnormal, the driver IC 20 can prevents the abnormality of the output state from being continued. That is, the driver IC 20 prevents the abnormality of the output state from being continued for a longer time than the time indicated by the error determination threshold value. Additionally, without directly checking the control data included in the received data frame, the driver IC 20 can prevent the abnormality of the output state from being continued for a longer time than the time indicated by the error determination threshold value. It is noted that the load 200 applied in this embodiment may be the load 200 that preferably turns off when the duration time of the on-state arrives at the error determination threshold value.

The driver IC 20 measures the duration time in which the converter 21 outputs the first instruction signal, thereby measuring the duration time in which the on-instruction transmitted from the microcomputer 10 is received. Hence, it is unnecessary to increase the total number of terminals between the driver IC 20 and the microcomputer 10. As a result, the driver IC 20 and the electronic control unit 100 can be downsized.

As indicated at the timing t3, when the time measured by the timer circuit 24 arrives at the error determination threshold value, the driver IC 20 may set an error flag. From the error flag, an external device such as the microcomputer 10 can confirms whether or not the on-duration abnormality is generated.

Additionally, when the measured time arrives at the error determination threshold value, the timer circuit 24 stops the measurement of the time. In this regard, only because the measured time merely arrives at the error determination threshold value, the timer circuit 24 does not clear the measured time but holds the time that arrives at the error determination threshold value. Then, the timer circuit 24 continues to stop the output of the output enable signal while the measured time is arriving at the error determination threshold value. As a result, the output circuit 22 is continuously the off-state while the time measured by the timer circuit 24 is arriving at the error determination threshold value. Hence, in the example of FIG. 3, the output circuit 22 continues the off-state even when the data frame including the data signal of the on-instruction is transmitted from the microcomputer 10 between the timings t3 and t4.

Next, explanation will be given on cases in which the communication terminal returns to a normal state. In this case, the microcomputer 10 can transmit the data frame including the off-instruction to the driver IC 20.

When the driver IC 20 receives the data frame including the off-instruction, which is transmitted from the microcomputer 10, after the output circuit 22 is forced to transition to the second state, the driver IC 20 operates as indicated at the timing t4. The converter 21 performs parallel conversion on the received data signal, and outputs the second instruction signal as the output instruction signal. Since the received output instruction signal switches from the first instruction signal to the second instruction signal, the timer circuit 24 clears the measuring duration time, and outputs the output enable signal. Then, since the output circuit 22 receives the second instruction signal, and receives the output enable signal, the output circuit 22 continues the off-state on the basis of the second instruction signal.

In this way, when the output state of the output circuit 22 is forced to transition to the off-state, the timer circuit 24 can continue the output of the output circuit 22 in the off-state until clearing the measured time. That is, when the on-duration abnormality is considered to be generated, the driver IC 20 can continue the off-state until receiving the data frame including the data signal of the off-instruction.

When the on-duration abnormality is considered to be generated and the driver IC 20 receives the off-instruction, the driver IC 20 may determine whether this data signal is normal or not. Then, when the on-duration abnormality is considered to be generated, the driver IC 20 may continue the off-state until receiving the data frame including the normal off-instruction.

When the driver IC 20 sets the error flag, the driver IC 20 may transmit to the microcomputer 10 the data signal indicating that the error flag is set, that is, the data signal indicating that the on-duration abnormality is generated. In this case, the microcomputer 10 transmits the command frame including command data of a read request for the error flag. The transmission of the command frame including the command data of the read request for the error flag may be periodically implemented. Then, when the driver IC 20 receives the command frame, the driver IC 20 generates the data frame including the data signal indicating that the error flag is set. Then, the driver IC 20 transmits the generated data frame to the microcomputer 10 through the MSC communication line 32. When the driver IC 20 transmits the generated data frame to the microcomputer 10, the driver IC 20 cancels the error flag as indicated at a timing t5.

Explanation is given on cases where the off-state is applied as the first state and the on-state is applied as the second state. In this configuration, the driver IC 20 measures the duration time of the off-state by allowing the timer circuit 24 to measure the duration time of the second instruction signal. Then, when the duration time of the off-state arrives at the error determination threshold value, the driver IC 20 forces the output state of the output circuit 22 to transition to the on-state as an off-duration abnormality. In this case, when the off-duration abnormality is considered to be generated, the driver IC 20 can continue the off-state until receiving the data frame including the data signal of the on-instruction. Even with this configuration, the same advantages as those described above can be obtained.

Figure 4:
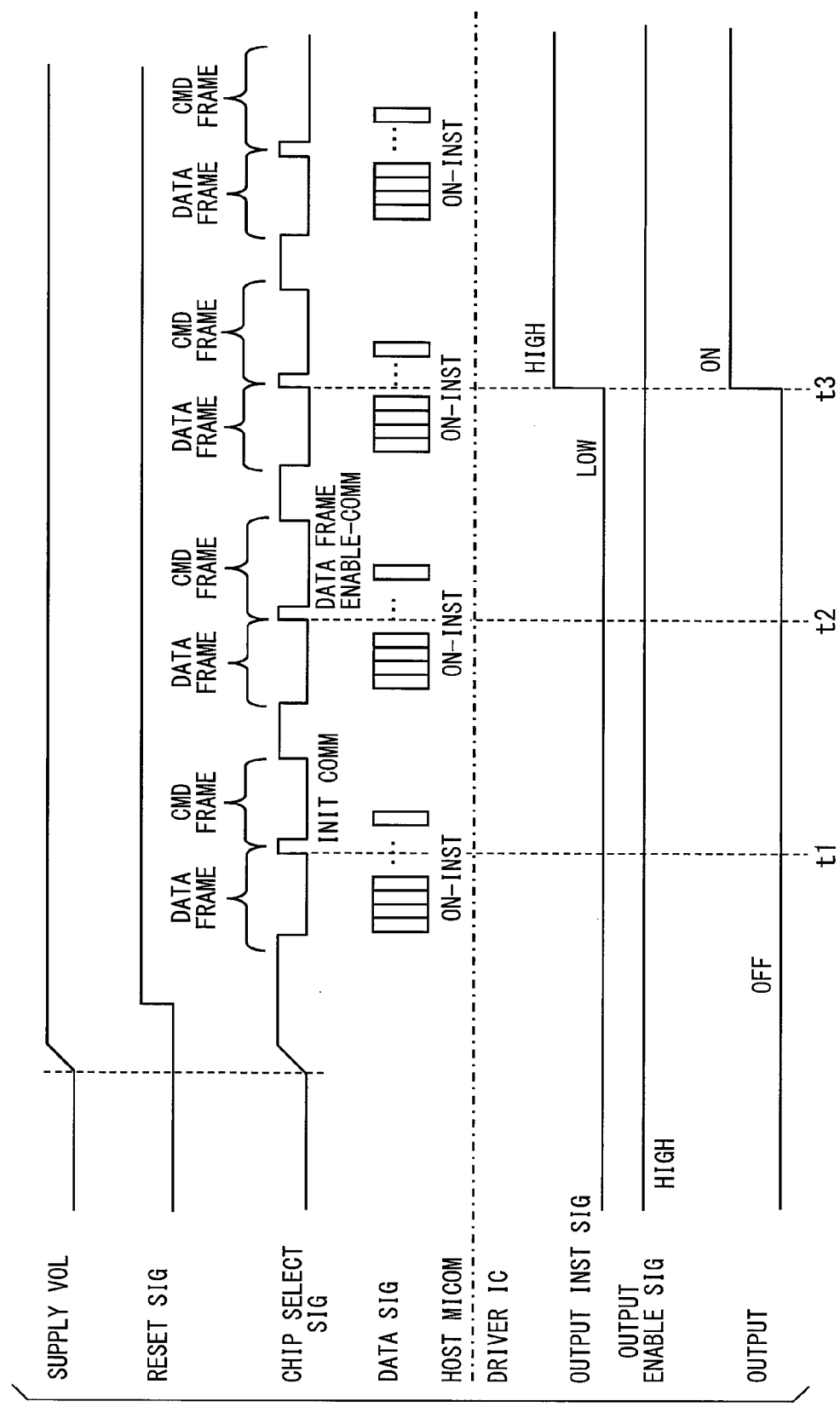
FIG. 4 is a timing chart illustrating processing operation at a time of starting supply of a supply voltage in the electronic control unit of FIG. 1.

Subsequently, the operation at the time of starting applying a supply voltage to the electronic control unit 100 will be described with reference to FIG. 4. The electronic control unit 100 is put into an operable state by, for example, being applied with a supply voltage which is an operating power supply from a power supply control unit (not shown). When the electronic control unit 100 is applied with the supply voltage, the electronic control unit 100 outputs a power supply holding signal to the power supply control unit in order to ensure the application of the supply voltage to the electronic control unit 100. Upon receiving the power supply holding signal, the power supply control unit continues to apply the supply voltage to the electronic control unit 100 until the power supply holding signal is canceled. When applying the supply voltage, the power supply control unit outputs a reset signal to the microcomputer 10.

When the application of the supply voltage starts, the microcomputer 10 may transmit the command frame including various initialization commands as the command data. The microcomputer 10 may transmit the command frame including the enable-command as the command data. The enable-command indicates that the transition instruction by the on-instruction and the off-instruction is enabled.

Upon receiving the command frame including the various initialization commands, the driver IC 20 conducts various initialization processes such as initializing the setting register 23, on the basis of the initialization command. When the converter 21 receives the command frame including the enable-command, the driver IC 20 allows the transition of the output state based on the first instruction signal and the second instruction signal by the output circuit 22. For example, when the converter 21 receives the command frame including the enable-command, the driver IC 20 allows the first instruction signal and the second instruction signal to be output to the output circuit 22 from the on/off register 21b. With the above operation, the driver IC 20 can allow the transition of the output state based on the first instruction signal and the second instruction signal by the output circuit 22.

Until the converter 21 receives the command frame including the enable-command, the driver IC 20 fixes the output state of the output circuit 22 to the second state, and prohibits the transition of the output state based on the first instruction signal and the second instruction signal. For example, until the converter 21 receives the command frame including the enable-command, the driver IC 20 prohibits the on/off register 21b from outputting the first instruction signal and the second instruction signal to the output circuit 22. With the above operation, the output state of the output circuit 22 is fixed to the second state, and the transition of the output state based on the first instruction signal and the second instruction signal is prohibited.

That is, the on-instruction and the off-instruction received until the converter 21 receives the enable-command are invalid. Hence, as indicated at the timings t1 and t2, until the converter 21 receives the command frame including the enable-command, the output circuit 22 does not allow the output state to transition even when the on-instruction is transmitted from the microcomputer 10. Then, as indicated at the timing t3, when the converter 21 receives the command frame including the enable-command, the output circuit 22 transitions to the on-state on the basis of the on-instruction transmitted from the microcomputer 10.

However, this configuration does not limit the present embodiment. The present embodiment may provide advantages even when the various initialization processes are not conducted. Additionally, the present embodiment may provide advantages even when the transition of the output state by the output circuit 22 is not allowed, according to the enable-command.

Additionally, the driver IC 20 may confirm the operation confirmation for confirming whether the timer circuit 24 normally operates. That is, the driver IC 20 confirms whether the timer circuit 24 can force the output state of the output circuit 22 to transition to the second state. The operation confirmation may be conducted, for example, at the time of starting the application of the supply voltage. Now, an example of conducting the operation confirmation at the time of starting the application of the supply voltage will be described with reference to FIG. 5.

Figure 5:
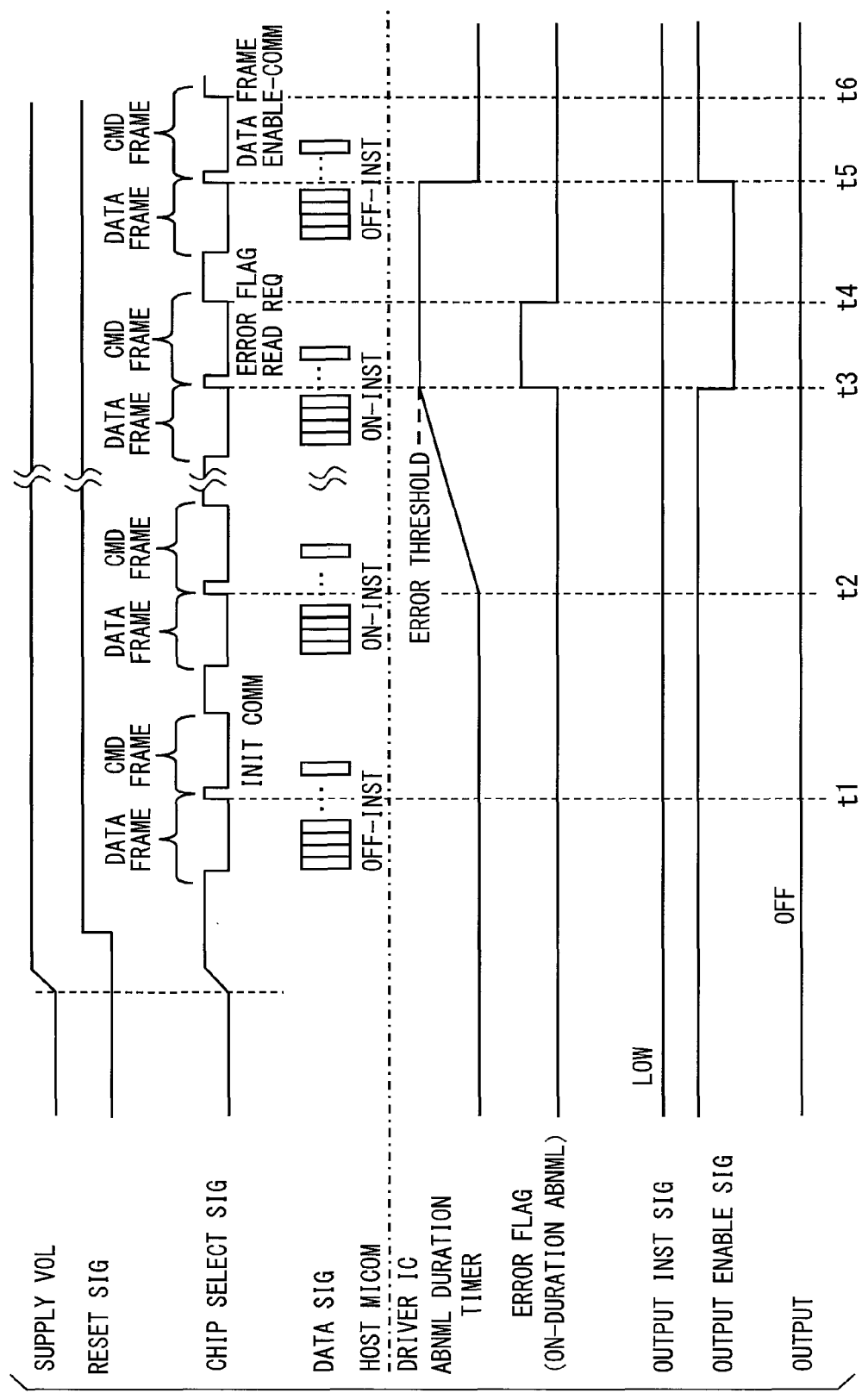
FIG. 5 is a timing chart illustrating operation confirmation processing conducted at the time of starting the supply of the supply voltage in the electronic control unit of FIG. 1.

When the operation confirmation is conducted at the time of starting the application of the supply voltage as illustrated in FIG. 5, it may be preferable that the operation confirmation is conducted before the microcomputer 10 transmits the enable-command. As indicated at the timing t1 and t2 in FIG. 5, the on-instruction and the off-instruction received until the converter 21 receives the enable-command are invalid.

Even before the converter 21 receives the command frame including the enable-command, when the timer circuit 24 receives the data frame including the on-instruction, the timer circuit 24 measures the duration time in which the data frame including the on-instruction is received. The timer circuit 24 starts the measurement of the duration time at the timing t2. In this situation, because the converter 21 does not receive the command frame including the enable-command, the output circuit 22 does not transition to the on-state. Then, when the measuring duration time arrives at the error determination threshold value, the timer circuit 24 sets the error flag as indicated at the timing t3. At the timing t4, the error flag is canceled in the same manner as described above. At the timing t5, a time measured in the same manner as that described above is cleared, and the output of the output enable signal restarts. At a timing t6, the transition of the output state based on the first instruction signal and the second instruction signal by the output circuit 22 is allowed in the same manner as that described above. The error flag corresponds to the abnormality flag.

It may be preferable that the error determination threshold value during the operation confirmation is set smaller than the error determination threshold value during the normal operation. That is, the time period represented by the error determination threshold value used during the operation confirmation is shorter than the time period represented by the error determination threshold value used during the normal operation. The error determination threshold value during the operation confirmation corresponds to a confirmation determination time. With the above operation, the operation confirmation can be conducted in a relatively short time.

Even when the on-instruction or the off-instruction is transmitted from the microcomputer 10, the driver IC 20 does not allow the output state to transition until receiving the enable-command. Hence, the driver IC 20 conducts the operation confirmation before the microcomputer 10 transmits the enable-command, so that the driver IC 20 can conduct the operation confirmation without driving the load 200.

It may be preferable that the timer circuit 24 sets the error flag when the measuring duration time arrives at the error determination threshold value even during the operation confirmation. With the above operation, the error flag is read by an external device such as the microcomputer 10 equipped outside of the driver IC 20 so that whether the forced transition is normally conducted can be confirmed.

Next, the operation at the time of stopping the application of the supply voltage to the electronic control unit 100 will be described with reference to FIG. 6. When a given operation stop condition, which is the inputting of the off-signal of an ignition switch to the electronic control unit 100 for example, is met, the electronic control unit 100 conducts shutdown processing. Then, upon completion of the shutdown processing, the electronic control unit 100 cancels the power supply holding signal outputted to the power supply control unit. With the above operation, the electronic control unit 100 stops the application of the supply voltage applied from the power supply control unit.

Figure 6:
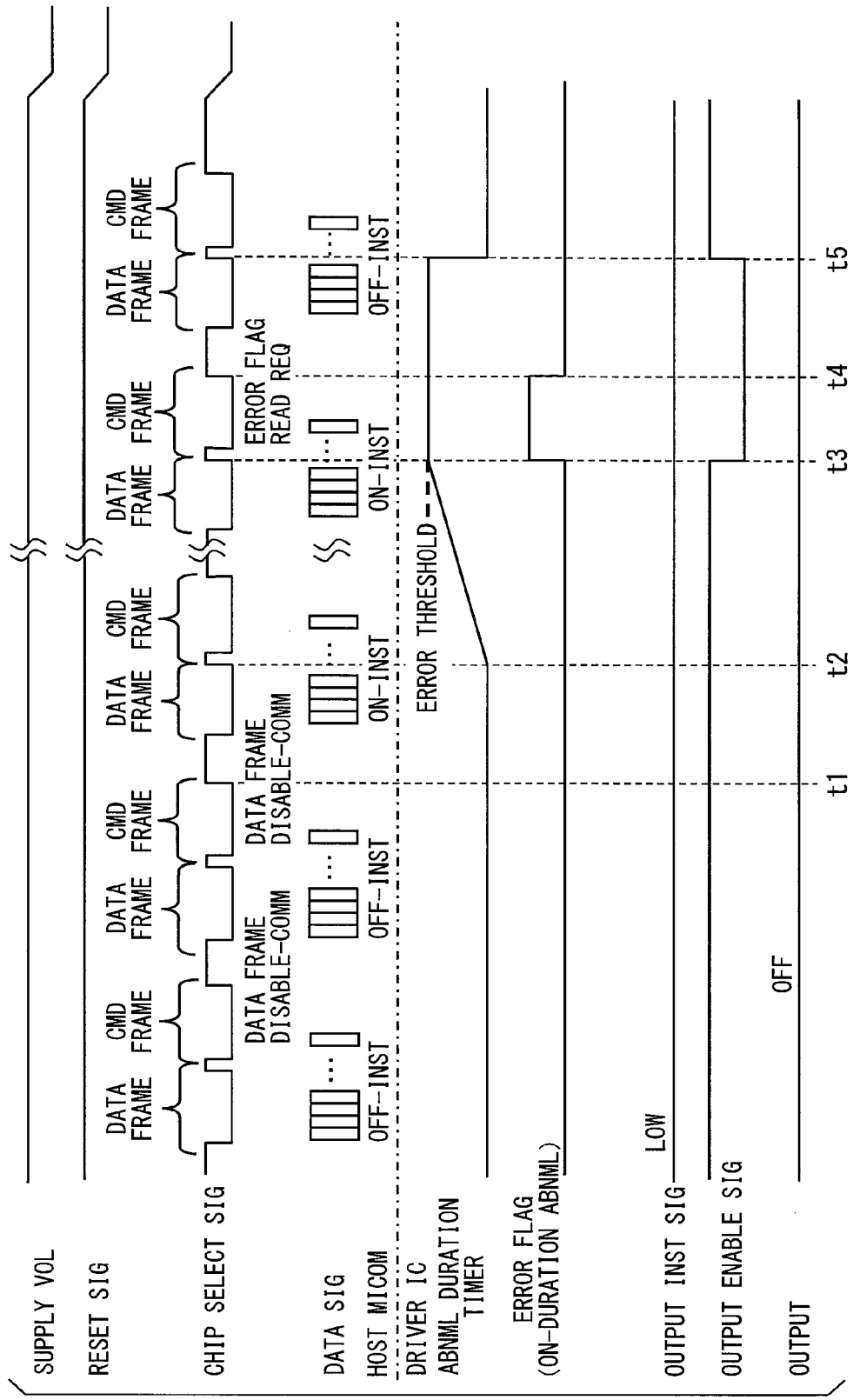
FIG. 6 is a timing chart illustrating operation confirmation processing conducted at a time of stopping the supply of the supply voltage in the electronic control unit of FIG. 1.

As illustrated in FIG. 6, for example, when the operation stop condition is met, the microcomputer 10 may transit the command frame including the disable-command as the command data. The disable-command indicates that the transition instruction by the on-instruction and the off-instruction is disabled. In response, when the converter 21 receives the command frame including the disable-command at least once, the transition of the output state based on the first instruction signal and the second instruction signal may not be conducted by the output circuit of the driver IC 20. That is, when the converter 21 receives the command frame including the disable-command, the transition of the output state of the output circuit 22 based on the first instruction signal and the second instruction signal is prohibited by the driver IC 20. For example, when the converter 21 receives the command frame including the disable-command, the driver IC 20 prohibits the output of the first instruction signal and the second instruction signal to the output circuit 22 from the on/off register 21b. With the above operation, the output state of the output circuit 22 can be fixed to the second state, and the transition of the output state based on the first instruction signal and the second instruction signal can be prohibited.

It is conceivable that the microcomputer 10 may erroneously transmit the command frame including the disable-command. Under the circumstances, when the converter 21 sequentially receives a plurality of the command frames each including the disable-command, the transition of the output state based on the first instruction signal and the second instruction signal may not be conducted by the output circuit 22 of the driver IC 20. With the above operation, the prohibition of the transition by the output circuit 22 according to the erroneously transmitted disable-command can be suppressed by the driver IC 20.

As illustrated in FIG. 6, this embodiment employs an example configuration in which when the converter 21 sequentially receives the plurality of the command frames each including the disable-command, the transition of the output state based on the first instruction signal and the second instruction signal is not conducted. The on-instruction and the off-instruction received after the converter 21 receives the disable-command are invalid. Hence, as indicated after the timing t1, when the converter 21 receives the command frame including the disable-command, the output circuit 22 does not allow the output state to transition even when the on-instruction is transmitted from the microcomputer 10.

Additionally, the above-mentioned operation confirmation may be conducted, for example, at the time of stopping the application of the supply voltage. Now, an example of conducting the operation confirmation at the time of stopping the application of the supply voltage will be described with reference to FIG. 6. When the operation confirmation is conducted at the time of stopping the application of the supply voltage, it may be preferable to conduct the operation confirmation after the microcomputer 10 transmits the disable-command as illustrated in FIG. 6.

Even after the converter 21 receives the command frame including the disable-command, when the converter 21 receives the data frame including the on-instruction, the timer circuit 24 measures the duration time in which the first serial data is received. The timer circuit 24 starts to measure the duration time at the timing t2 in the same manner as that described above. In this situation, because the converter 21 receives the command frame including the disable-command, the output circuit 22 does not transition to the on-state. Then, when the measuring duration time arrives at the error determination threshold value in the same manner as that described above, the timer circuit 24 stops the output of the output enable signal, and sets the error flag as indicated at the timing t3. At the timing t4, the timer circuit 24 cancels the error flag in the same manner as that described above. At the timing t5, the timer circuit 24 clears the measuring time in the same manner as that described above, and restarts the output of the output enable signal.

When the driver IC 20 receives the disable-command, even when the on-instruction or the off-instruction is transmitted from the microcomputer 10, the driver IC 20 does not allow the output state to transition. Hence, the driver IC 20 conducts the operation confirmation after the microcomputer 10 transmits the disable-command, so that the driver IC 20 can conduct the operation confirmation without driving the load 200. This operation may be preferable because the operation confirmation is conducted not before the enable-command is received, but after the disable-command is received, so that a start time of the electronic control unit 100 can be reduced.

As described above, the driver IC 20 may be equipped with a plurality of output circuits 22. In this case, different loads 200 to be driven are connected to the plurality of output circuits 22. The plurality of output circuits 22 put the state into the first state and the second state for the corresponding loads 200, individually. That is, each of the output circuits 22 puts the load 200, which is to be driven by the each output circuit 22, into the first state and the second state.

In this case, the error determination threshold values for the respective loads 200 may have different values. The error determination threshold values corresponding to the respective loads 200 are stored in the setting register 23. That is, the error determination threshold values are stored in the setting register 23 in association with the respective loads 200. The duration time of the first state may be different depending on the loads 200. Hence, the above configuration can deal with the various loads 200, and the general versatility can be improved.

Additionally, the respective error determination threshold values may be arbitrarily set from the host microcomputer 10. In this case, the microcomputer 10 transmits the command frame including, as the command data, the error determination threshold values corresponding to the respective loads 200 and the setting instructions of the error determination threshold values corresponding to the respective loads 200. The error determination threshold values corresponding to the respective loads 200, and the setting instructions of the error determination threshold values corresponding to the respective loads 200 can be called "time setting commands".

Then, when the converter 21 receives the command frame including the time setting command as data, the setting register 23 stores the error determination threshold values in association with the respective plural loads 200 on the basis of the time setting command therein. This configuration can deal with the various loads 200, and the general versatility can be further improved. However, this configuration does not limit the embodiments of the present disclosure. The error determination threshold values for the plural loads 200 may have the same value.

Additionally, the plurality of loads 200 can include a load 200 preferred to put into the off-state when the duration time of the on-state arrives at the error determination threshold value, and a load 200 preferred to put into the on-state when the duration time of the off-state arrives at the error determination threshold value.

In this case, the state information indicative of the first state and the second state for the respective plural loads 200 are stored in the setting register 23 as the setting values. In more detail, the state information includes first state information in which the on-state is set as the first state, and the off-state is set as the second state, and second state information in which the off-state is set as the first state, and the on-state is set as the second state. Hence, the first state information or the second state information is stored in the setting register 23 in association with the respective plural loads 200.

In this case, when the first state information is stored as the state information for the load 200 to be driven and the duration time of the on-state being the first state arrives at the error determination threshold value, the timer circuit 24 forces the on-state to transition to the off-state being the second state. When the second state information is stored as the transition information for the load 200 to be driven and the duration time of the off-state being the first state arrives at the error determination threshold value, the timer circuit 24 forces the off-state to transition to the on-state being the second state. This configuration can deal with the various loads 200, and the general versatility can be improved.

Additionally, the respective state information may be arbitrarily set from the microcomputer 10. In this case, the microcomputer 10 transmits the command frame including the state information corresponding to the respective loads 200, and the setting instructions of the state information corresponding to the respective loads 200 as the command data. The state information corresponding to the respective loads 200, and the setting instructions of the state information corresponding to the respective loads 200 can be called "state setting commands".

Then, when the converter 21 receives the command frame including the state setting command as data, the setting register 23 stores the state information in association with the respective plural loads 200 on the basis of the state setting commands. This configuration can deal with the various loads 200, and the general versatility can be further improved. However, the present disclosure is not limited to this configuration. The state information may employ the same value for the plural loads 200.

Additionally, the plurality of loads 200 may include a load 200 enabled to forcibly transition to the second state, and a load 200 disabled to forcibly transition to the second state. In this case, the transition information indicating that each of the plural loads 200 is enabled or displayed to forcibly transition to the second state is stored in the setting register 23 as the setting values in advance. That is, the transition information indicative of the enabling or the transition information indicative of disabling is stored in the setting register 23 in association with the respective plural loads 200.

In this case, when the transition information indicative of the enabling is stored as the transition information for the load 200 to be driven and the measuring duration time arrives at the error determination threshold value, the timer circuit 24 forces the state to transition to the second state. However, when the transition information indicative of the disabling is stored as the transition information for the load 200 to be driven and the measuring duration time arrives at the error determination threshold value, the timer circuit 24 does not force the state to transition to the second state.

The loads 200 may include a load 200 not desired to forcedly transition to the second state. This configuration can deal with the various loads 200, and the general versatility can be improved.

Additionally, the respective transition information may be arbitrarily set from the host microcomputer 10. In this case, the microcomputer 10 transmits the command frame including the transition information corresponding to the respective loads 200, and the setting instructions of the transition information corresponding to the respective loads 200 as the command data. The transition information corresponding to the respective loads 200, and the setting instructions of the transition information corresponding to the respective loads 200 can be called "transition setting commands".

Then, when the converter 21 receives the command frame including the transition setting command as data, the setting register 23 stores the transition information in association with the respective plural loads 200 on the basis of the transition setting command. This configuration can deal with the various loads 200, and the general versatility can be further improved. However, this configuration does not limit embodiments of the present disclosure. The transition information may employ the same value for the plural loads 200.

This embodiment may employ the driver IC 20 that receives the communication frame through the serial communication using the MSC. However, the present disclosure is not limited to this configuration. The driver IC may receive the communication frame through the serial communication in the communication cycle shorter than the microsecond level. In other words, the driver IC may receive the communication frame through the serial communication of a communication cycle that is difficult to continuously implement calculation such as parity check or sum check. Even when the driver IC receives the communication frame through the serial communication of this communication cycle, the abnormality of the output state can be prevented from being continued longer than the error determination threshold value.

Embodiments of the present disclosure have been illustrated above. However, the above-illustrated embodiments do not limit embodiments of the present disclosure and can be variously modified without departing from the spirit of the present disclosure.

What is claimed is:

1. A load driving device for receiving a communication frame including a data signal through a serial communication and for setting an output state of a load driving output, which is for driving at least one load, to a first state and a second state different from the first state based on a control data when the control data is included in the received communication frame as the data signal,
the load driving device comprising:
a converter for receiving the communication frame and performing parallel conversion on the data signal included in the communication frame to output a converted signal,
the converter performing the parallel conversion to output a first instruction signal indicating a transition instruction to transition to the first state when a first serial data indicating the transition instruction to transition to the first state is included as the control data in the communication frame, and
the converter performing the parallel conversion to output a second instruction signal indicating a transition instruction to transition to the second state when a second serial data indicating the transition instruction to the second state is included as the control data in the communication frame;
at least one output circuit having the first state when the first instruction signal is outputted from the converter, and having the second state when the second instruction signal is output from the converter; and
a timer circuit for measuring a duration time during which the converter receives the first serial data, and for instructing the output state of the output circuit,
the timer circuit forcing the output circuit to transition to the second state when the measuring duration time arrives at an abnormality determination time; wherein;
when the load drive device is put into an electric power supplied state, the timer circuit outputs an output enable signal;
the output circuit, when receiving the output enable signal from the timer circuit, has the first state or the second state depending on whether the first instruction signal or the second instruction signal is outputted from the converter;
the output circuit, when not receiving the output enable signal from the timer circuit, has the second state regardless of whether the first instruction signal or the second instruction signal is outputted from the converter; and
when the measuring duration time, during which the converter receives the first serial data and outputs the first instruction signal, arrives at the abnormality determination time, the timer circuit stops output of the output enable signal, thereby forcing the output circuit to transition to the second state.

2. The load driving device according to claim 1, wherein the converter receives the communication frame through a serial communication using a microsecond channel.

3. The load driving device according to claim 1, wherein when the data signal received by the converter switches from the first serial data to the second serial data, the timer circuit clears the measuring duration time.

4. The load driving device according to claim 3, wherein when the timer circuit forces the output state of the output circuit to transition to the second state, the timer circuit holds the output state of the output circuit in the second state until the timer circuit clears the measuring duration time.

5. The load driving device according to claim 1, wherein:
the converter receives the communication frame including a disable-command as the data signal through the serial communication, the disable-command indicating that the transition instruction by the first serial data and the second serial data is disabled; and
when the converter receives the communication frame including the disable-command at least once, transition of the output state based on the first instruction signal and the second instruction signal is not conducted by the output circuit.

6. The load driving device according to claim 1, wherein:
the output circuit receives the communication frame including an enable-command as the data signal through the serial communication, the enable-command indicating that the transition instruction by the first serial data and the second serial data is enabled; and
when the converter receives the communication frame including the enable-command, the output circuit conducts the transition of the output state based on the first instruction signal and the second instruction signal.

7. A load driving device for receiving a communication frame including a data signal through a serial communication and for setting an output state of a load driving output, which is for driving at least one load, to a first state and a second state different from the first state based on a control data when the control data is included in the received communication frame as the data signal,
the load driving device comprising:
a converter for receiving the communication frame and performing parallel conversion on the data signal included in the communication frame to output a converted signal,
the converter performing the parallel conversion to output a first instruction signal indicating a transition instruction to transition to the first state when a first serial data indicating the transition instruction to transition to the first state is included as the control data in the communication frame, and the converter performing the parallel conversion to output a second instruction signal indicating a transition instruction to transition to the second state when a second serial data indicating the transition instruction to the second state is included as the control data in the communication frame;

at least one output circuit having the first state when the first instruction signal is outputted from the converter, and having the second state when the second instruction signal is output from the converter; and a timer circuit for measuring a duration time during which the converter receives the first serial data, and for instructing the output state of the output circuit, the tinier circuit forcing the output circuit to transition to the second state when the measuring duration time arrives at an abnormality determination time, wherein:

the converter receives the communication frame including a disable-command as the data signal through the serial communication, the disable-command indicating that the transition instruction by the first serial data and the second serial data is disabled;

when the converter receives the communication frame including the disable-command at least once, transition of the output state based on the first instruction signal and the second instruction signal is not conducted by the output circuit; and when the converter successively receives the communication frame including the disable-command a plurality of times, the transition of the output state to the first state and the transition of the output state to the second state are not conducted by the output circuit.

8. A load driving device for receiving a communication frame including a data signal through a serial communication and for setting an output state of a load driving output, which is for driving at least one load, to a first state and a second state different from the first state based on a control data when the control data is included in the received communication frame as the data signal, the load driving device comprising:

a converter for receiving the communication frame and performing parallel conversion on the data signal included in the communication frame to output a converted signal, the converter performing the parallel conversion to output a first instruction signal indicating a transition instruction to transition to the first state when a first serial data indicating the transition instruction to transition to the first state is included as the control data in the communication frame, and the converter performing the parallel conversion to output a second instruction signal indicating a transition instruction to transition to the second state when a second serial data indicating the transition instruction to the second state is included as the control data in the communication frame;

at least one output circuit having the first state when the first instruction signal is outputted from the converter, and having the second state when the second instruction signal is output from the converter; and a timer circuit for measuring a duration time during which the converter receives the first serial data, and for instructing the output state of the output circuit, the tinier circuit forcing the output circuit to transition to the second state when the measuring duration time arrives at an abnormality determination time, wherein:

the converter receives the communication frame including a disable-command as the data signal through the serial communication, the disable-command indicating that the transition instruction by the first serial data and the second serial data is disabled;

when the converter receives the communication frame including the disable-command at least once, transition of the output state based on the first instruction signal and the second instruction signal is not conducted by the output circuit; and when the converter receives the first serial data while the disable-command is causing the output state of the output circuit not to transition to the output state to the first state nor the second state, the timer circuit (i) measures the duration time during which the first serial data is received, and (ii) sets an abnormality flag when the measuring duration time arrives at a confirmation determination time, which is shorter than the abnormality determination time.

9. A load driving device for receiving a communication frame including a data signal through a serial communication and for setting an output state of a load driving output, which is for driving at least one load, to a first state and a second state different from the first state based on a control data when the control data is included in the received communication frame as the data signal, the load driving device comprising:

a converter for receiving the communication frame and performing parallel conversion on the data signal included in the communication frame to output a converted signal, the converter performing the parallel conversion to output a first instruction signal indicating a transition instruction to transition to the first state when a first serial data indicating the transition instruction to transition to the first state is included as the control data in the communication frame, and the converter performing the parallel conversion to output a second instruction signal indicating a transition instruction to transition to the second state when a second serial data indicating the transition instruction to the second state is included as the control data in the communication frame;

at least one output circuit having the first state when the first instruction signal is outputted from the converter, and having the second state when the second instruction signal is output from the converter; and a timer circuit for measuring a duration time during which the converter receives the first serial data, and for instructing the output state of the output circuit, the timer circuit forcing the output circuit to transition to the second state when the measuring duration time arrives at an abnormality determination time, wherein:

the output circuit receives the communication frame including an enable-command as the data signal through the serial communication, the enable-command indicating that the transition instruction by the first serial data and the second serial data is enabled;

when the converter receives the communication frame including the enable-command, the output circuit conducts the transition of the output state based on the first instruction signal and the second instruction signal; and when the converter receives the first serial data before receiving the communication frame including the enable-command, the timer circuit (i) measures the duration time during which the first serial data is received, and (ii) sets an abnormality flag when the measuring duration time arrives at a confirmation determination time, which is shorter than the abnormality determination time.

10. A load driving device for receiving a communication frame including a data signal through a serial communication and for setting an output state of a load driving output, which is for driving at least one load, to a first state and a second state different from the first state based on a control data when the control data is included in the received communication frame as the data signal, the load driving device comprising:
a converter for receiving the communication frame and performing parallel conversion on the data signal included in the communication frame to output a converted signal,
    the converter performing the parallel conversion to output a first instruction signal indicating a transition instruction to transition to the first state when a first serial data indicating the transition instruction to transition to the first state is included as the control data in the communication frame, and
    the converter performing the parallel conversion to output a second instruction signal indicating a transition instruction to transition to the second state when a second serial data indicating the transition instruction to the second state is included as the control data in the communication frame;
at least one output circuit having the first state when the first instruction signal is outputted from the converter, and having the second state when the second instruction signal is output from the converter, and
a timer circuit for measuring a duration time during which the converter receives the first serial data, and for instructing the output state of the output circuit,
    the timer circuit forcing the output circuit to transition to the second state when the measuring duration time arrives at an abnormality determination time, wherein:
the at least one output circuit includes a plurality of output circuits;
the at least one load includes a plurality of loads; and
the output circuits, each having the output state including the first state and the second state, are individually provided for respective loads,
the load driving device further comprising:
a setting register for storing the abnormality determination times corresponding to the loads, wherein:
when the converter receives the communication frame including a time setting command as the data signal, the setting register stores the abnormality determination times corresponding to the respective loads based on the time setting command.

11. A load driving device for receiving a communication frame including a data signal through a serial communication and for setting an output state of a load driving output, which is for driving at least one load, to a first state and a second state different from the first state based on a control data when the control data is included in the received communication frame as the data signal, the load driving device comprising:
a converter for receiving the communication frame and performing parallel conversion on the data signal included in the communication frame to output a converted signal,
    the converter performing the parallel conversion to output a first instruction signal indicating a transition instruction to transition to the first state when a first serial data indicating the transition instruction to transition to the first state is included as the control data in the communication frame, and
    the converter performing the parallel conversion to output a second instruction signal indicating a transition instruction to transition to the second state when a second serial data indicating the transition instruction to the second state is included as the control data in the communication frame,
at least one output circuit having the first state when the first instruction signal is outputted from the converter, and having the second state when the second instruction signal is output from the converter; and
a timer circuit for measuring a duration time during which the converter receives the first serial data, and for instructing the output state of the output circuit,
the timer circuit forcing the output circuit to transition to the second state when the measuring duration time arrives at an abnormality determination time, wherein:
the at least one output circuit includes a plurality of output circuits;
the at least one load includes a plurality of loads; and
the output circuits, each having the output state including the first state and the second state, are individually provided for respective loads,
the load driving device further comprising:
a setting register for storing state information indicating the first state and the second state for the respective loads, wherein:
when the converter receives the communication frame including a state setting command as the data signal, the setting register stores the state information corresponding to the respective loads based on the state setting command.

12. A load driving device for receiving a communication frame including a data signal through a serial communication and for setting an output state of a load driving output, which is for driving at least one load, to a first state and a second state different from the first state based on a control data when the control data is included in the received communication frame as the data signal, the load driving device comprising:
a converter for receiving the communication frame and performing parallel conversion on the data signal included in the communication frame to output a converted signal,
    the converter performing the parallel conversion to output a first instruction signal indicating a transition instruction to transition to the first state when a first serial data indicating the transition instruction to transition to the first state is included as the control data in the communication frame, and
    the converter performing the parallel conversion to output a second instruction signal indicating a transition instruction to transition to the second state when a second serial data indicating the transition instruction to the second state is included as the control data in the communication frame;
at least one output circuit having the first state when the first instruction signal is outputted from the converter, and having the second state when the second instruction signal is output from the converter; and
a timer circuit for measuring a duration time during which the converter receives the first serial data, and for instructing the output state of the output circuit, the timer circuit forcing the output circuit to transition to the second state when the measuring duration time arrives at an abnormality determination time, wherein:

the at least one output circuit includes a plurality of output circuits;

the at least one load includes a plurality of loads; and the output circuits, each having the output state including the first state and the second state, are individually provided for respective loads, the load driving device further comprising:

a setting register for storing transition information for each of the loads, the transition information indicating that a forced transition to the second state is enabled or disabled, wherein:

when the converter receives the communication frame including a transition setting command as the data signal, the setting register stores the transition information corresponding to the respective loads based on the transition setting command.

13. A load driving device comprising:

a converter for receiving a communication frame including a data signal through a serial communication and performing parallel conversion on the data signal included in the communication frame to output a converted signal; and at least one output circuit connected between the converter and a load to drive the load according to an output state of the output circuit, the output sate of the output circuit including a first state and a second state different form the first state, wherein the converter performs the parallel conversion to output a first instruction signal indicating a transition instruction to the output circuit to transition to the first state when a first serial data, which indicates the transition instruction to the output circuit to transition to the first state, is included as a control data in the received communication frame, wherein the converter performs the parallel conversion to output a second instruction signal indicating a transition instruction to the output circuit to transition to the second state when a second serial data, which indicates the transition instruction to the output circuit to the second state, is included as the control data in the received communication frame, the load driving device further comprising:

a timer circuit for measuring a duration time during which the converter receives the first serial data, the timer circuit forcing the output circuit to transition to the second state when the measuring duration time arrives at an abnormality determination time, the timer circuit clearing the measuring duration time when the data signal received by the converter switches from the first serial data to the second serial data, wherein:

when the load drive device is put into an electric power supplied state, the timer circuit outputs an output enable signal;

the output circuit, when receiving the output enable signal from the timer circuit, has the first state or the second state depending on whether the first instruction signal or the second instruction signal is outputted from the converter;

the output circuit, when not receiving the output enable signal from the timer circuit, has the second state regardless of whether the first instruction signal or the second instruction signal is outputted from the converter; and when the measuring duration time, during which the converter receives the first serial data and outputs the first instruction signal, arrives at the abnormality determination time, the timer circuit stops output of the output enable signal, thereby forcing the output circuit to transition to the second state.

* * * * *